United States Patent
Deprugney et al.

(10) Patent No.: US 10,119,518 B2
(45) Date of Patent: Nov. 6, 2018

(54) CONTROL SYSTEM FOR FLOW OF TURBINED WATER FROM A PLURALITY OF HYDROELECTRIC PLANTS

(71) Applicant: ELECTRICITE DE FRANCE, Paris (FR)

(72) Inventors: Luc Deprugney, Paris (FR); Jennifer Zarate, La Garenne Colombes (FR); Gerard Robert, La Motte Servolex (FR)

(73) Assignee: ELECTRICITE DE FRANCE, Paris (FR)

( * ) Notice: Subject to any disclaimer, the term of this patent is extended or adjusted under 35 U.S.C. 154(b) by 0 days.

(21) Appl. No.: 15/537,844

(22) PCT Filed: Dec. 22, 2015

(86) PCT No.: PCT/FR2015/053707
§ 371 (c)(1),
(2) Date: Jun. 19, 2017

(87) PCT Pub. No.: WO2016/102880
PCT Pub. Date: Jun. 30, 2016

(65) Prior Publication Data
US 2018/0045168 A1     Feb. 15, 2018

(30) Foreign Application Priority Data
Dec. 22, 2014   (FR) ..................................... 14 63076

(51) Int. Cl.
*F03B 15/14*   (2006.01)
*F03B 15/16*   (2006.01)
(Continued)

(52) U.S. Cl.
CPC ................ *F03B 15/14* (2013.01); *E02B 9/02* (2013.01); *F03B 15/16* (2013.01); *F03B 17/06* (2013.01); *F05B 2240/40* (2013.01)

(58) Field of Classification Search
CPC .. F03B 15/14; F03B 15/16; E02B 9/02; E02B 9/08
See application file for complete search history.

(56) References Cited

U.S. PATENT DOCUMENTS 2,724,082 A * 11/1955 Hornfeck .............. H02J 15/003
                                                                  290/52
2,962,599 A * 11/1960 Pirkey ....................... E02B 9/00
                                                                  290/4 R
(Continued)

FOREIGN PATENT DOCUMENTS

| DE | 102005007639 A1 * | 10/2006 | ............. F03B 13/00 |
| FR | 2983536 | 6/2013 | |
| WO | WO-2013079576 A1 * | 6/2013 | ............. F03B 13/06 |

OTHER PUBLICATIONS

Cook, J., et al., "Optimization of hydro-power plants for generation," URL:http://www.igem.org/Paper2008/02 (Feb. 1, 2008).
(Continued)

Primary Examiner — Frederick L Lagman
(74) Attorney, Agent, or Firm — Womble Bond Dickinson (US) LLP

(57) ABSTRACT

A system for controlling the flow of turbined water from a plurality of hydroelectric plants arranged in series along a watercourse with an open channel flow, defining upstream of each plant, a plurality of head races subject respectively to hydraulic flow and level constraints. The flow of water turbined by each of the plants is controlled by a flow setpoint. The system includes regulation of a global electrical production power set-point for the plurality of hydroelectric plants by a flow regulation setpoint taking into (Continued)

account the flow setpoint of each of the plants. The flow regulation setpoint determined by the regulation is weighted for each of the plants by weighting coefficients as a function of the respective hydraulic characteristics of the head plurality of races.

13 Claims, 3 Drawing Sheets

(51) Int. Cl.
*E02B 9/02* (2006.01)
*F03B 17/06* (2006.01)

(56) References Cited

U.S. PATENT DOCUMENTS

| | | | | |
|---|---|---|---|---|
| 4,109,160 A | * | 8/1978 | Goto | F03B 13/06 290/52 |
| 4,241,283 A | * | 12/1980 | Storer, Sr. | E02B 9/04 290/43 |
| 5,360,290 A | * | 11/1994 | Yamada | E02B 9/06 405/52 |
| 5,472,312 A | | 12/1995 | Takeda et al. | |
| 5,754,446 A | * | 5/1998 | Fisher, Jr. | F03B 15/12 290/40 R |
| 6,396,162 B1 | * | 5/2002 | Carrillo | F03B 13/08 290/43 |
| 7,866,919 B2 | * | 1/2011 | Miller | E02B 9/02 405/51 |
| 8,643,206 B2 | * | 2/2014 | Ekern | F03B 13/06 290/52 |
| 2009/0127859 A1 | * | 5/2009 | Jones | F03B 13/06 290/53 |
| 2010/0133841 A1 | * | 6/2010 | Stummer | E02B 9/00 290/52 |
| 2012/0326443 A1 | * | 12/2012 | Vince | F01D 15/10 290/7 |

OTHER PUBLICATIONS

Electricite De France, "French Preliminary Search Report," FR Application No. 1463076 (dated Oct. 22, 2015) (with English translation cover sheet).
Electricite De France, "International Search Report," PCT Application No. PCT/FR2015/053707 (dated May 9, 2016).
Electricite De France, "Written Opinion," PCT Application No. PCT/FR2015/053707 (dated May 9, 2016).

* cited by examiner

CONTROL SYSTEM FOR FLOW OF TURBINED WATER FROM A PLURALITY OF HYDROELECTRIC PLANTS

GENERAL TECHNICAL FIELD AND BACKGROUND OF THE INVENTION

The present invention generally relates to hydroelectric plants arranged in series along a watercourse. The invention more precisely relates to a system for driving a turbined water flow rate of a plurality of hydroelectric plants arranged in series along a watercourse, as well as a plurality of hydroelectric plants driven by said driving system.

Turbined water designates the water passing through a hydraulic turbine in a fall in order to produce mechanical energy which is then converted into electrical energy. Thus, the electric power generated can be deduced from the turbined water flow rate, and vice-versa, by means of conversion charts.

The situation in which hydroelectric plants are arranged in series along a watercourse is a common situation, since it corresponds for example to cases in which several power generation hydraulic structures are arranged along a river or a tributary, for example in a valley.

Figure 1:
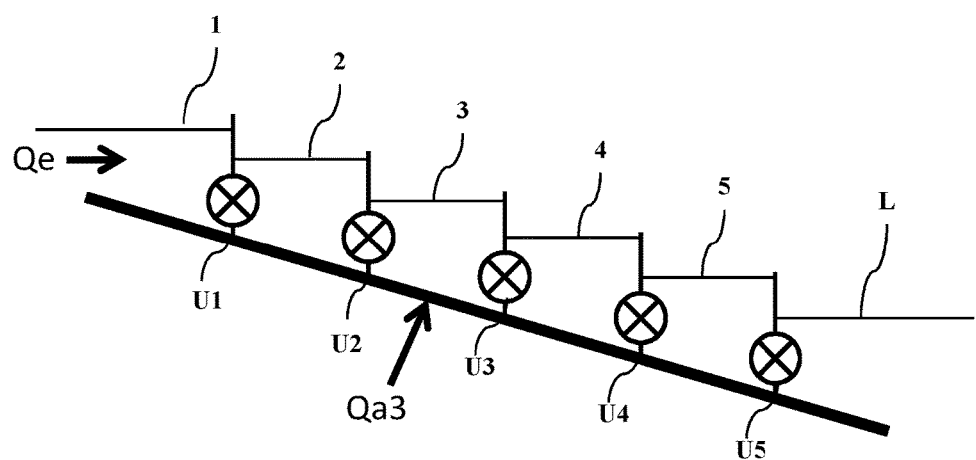

Such a situation is schematised in FIG. 1, which is a scheme illustrating a non-limiting example of the arrangement of five hydroelectric plants arranged in series along a watercourse defining upstream of the same a plurality of corresponding reaches.

In this scheme, the plants and reaches are numbered in the order of their arrangement along the watercourse, from upstream to downstream, the water circulation direction being noted by an arrow. Thus, for example, plant U3 has plants U1 and U2 as upstream plants, and plants U4 and U5 as downstream plants.

Likewise, reach 3 surrounded by plant U3 and plant U2, has as its upstream reaches reach 1 upstream of plant U1 and reach 2 between plant U1 and plant U2, and has as its downstream reaches, reaches 4 and 5 respectively defined between plant U3 and plant U4, and between plant U4 and plant U5. Each reach i is defined by the portion of the watercourse immediately upstream of plant $U_i$, that is between plant Ui-1 and plant Ui, and is in particular characterised by a water level.

These plants are arranged "run-of-the-river" along the watercourse, typically a watercourse such as a river, a tributary or a canal. Thus, water arrives from reach 1 upstream of the plurality of plants first passes through the first plant U1 to reach the second reach 2, and then passes through the second plant U2 to reach the third reach 3, . . . up to pass through the last plant U5 and leave the plurality of reaches, for example to join the watercourse L downstream of the plurality of plants, or even a sea.

The following description will be purely illustrative and in no way limiting in reference to such a configuration. Further, for the sake of clarity and concision, in the rest of the description, the index i will be referred to as a general reference of an ordinal index. Thus, i can designate 1, 2, 3, 4 or 5, as well as plant Ui will designate plant U1, plant U2, plant U3, plant U4 or plant U5.

These run-of-the-river hydroelectric plants are installed in cascade along a river or a tributary and are exploited with the main objective, besides power generation, not to disturb the natural flow of the watercourse used for multiple uses (maritime navigation, agricultural withdrawals, nautical activities . . . ): the aim is mainly to convey flow rate from upstream to downstream by fulfilling flow rate (amplitude and variation) and level hydraulic requirements, that is maintaining in each of the reaches i, the water level within acceptable limits. To that end, the plants are equipped with a level regulation which modifies the flow rate setpoint of the facility in order to regulate the level.

Run-of-the-river plants have an unavoidable power generation difficult to foresee which undergoes variation of the uncontrolled inflow rate Qe as well as unforeseen supplies/withdrawals in the reaches i, such as the tributary flow rate $Q_{a3}$ feeding the reach 3 in FIG. 1. That results in resorting to a level regulation of the reaches i, modifying the power produced by the plant and thus de-optimising the production program designed by the optimiser (in charge of optimising the production on the entire facility covered by the producer) the day before. Indeed, an underproduction of the queue created by a hydraulic disturbance has to be compensated for by starting another production means which has a cost.

In view of the unforeseen hydraulic events (catchment area draining, rain, withdrawals in a reach, turbine variation of the upstream plant) that can occur upstream of a chain of run-of-the-river plants, fulfilling a daily production program is difficult and the modifications of the production program causing redefinitions of the power setpoint value applied to the series of plants, are detrimental to the fulfillment of a production program.

Furthermore, hydroelectric plants are increasingly resorted to contribute in real time to the production-consumption balance of the grid by providing a frequency regulation service (commonly called "Ancillary Service"). It consists in varying in real time the provided power about its operating point by following the variations in the frequency of the power grid (it is called a frequency-power primary regulation) and/or the evolution of the remote control level N (it is called a frequency-power secondary regulation).

The frequency-power secondary regulation service given to the grid by the producer is particularly difficult to reconcile with hydraulic requirements: the variations in turbined flow rate to provide this service disturb the water level in the reaches which is controlled by the level regulation. In the absence of a particular device, this level regulation naturally counterbalances the frequency-power secondary regulation. Reconciling this frequency-power secondary regulation and the fulfillment of the hydraulic requirements in the reaches is thus clearly difficult.

Figure 2:
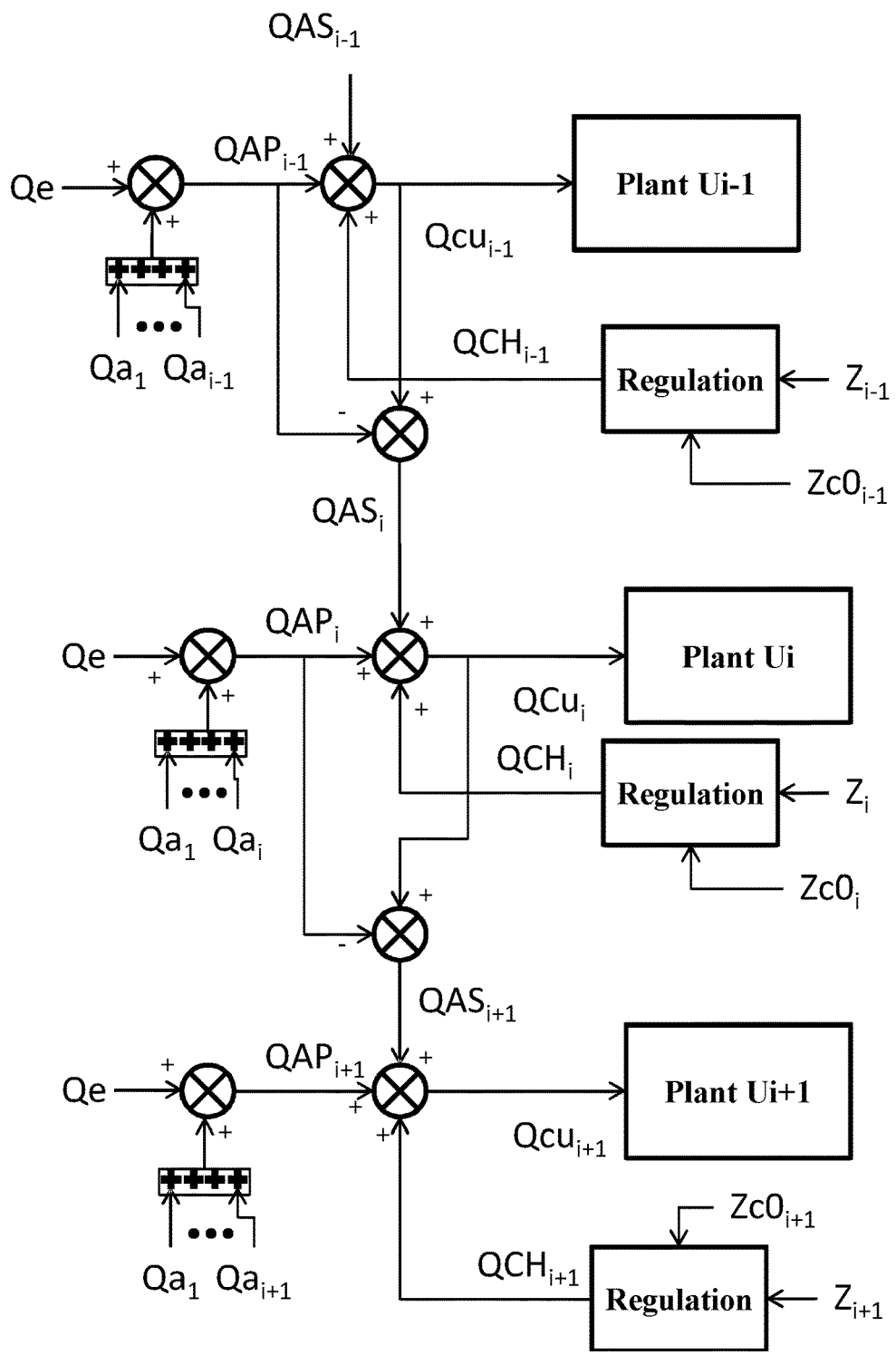

FIG. 2 is a scheme illustrating a system for driving a plurality of hydroelectric plants arranged in series along a watercourse. For the sake of clarity and concision, three plants are illustrated: a plant Ui, a plant Ui-1 upstream of plant Ui, and plant Ui+1 downstream of plant Ui.

Conventionally, run-of-the-river hydroelectric plants are managed in a flow rate with a flow rate setpoint on plant Ui ($QCu_i$) equal to the run-of-the-river flow rate setpoint $QF_i$. For run-of-the-river hydroelectric plants, the objective is traditionally to mandatorily fulfil the hydraulic (flow rate and level) requirements for the different reaches i and to respect as much as possible a power program defined for 24 h by the optimiser. The control on the water flow rate $Qcu_i$ turbined by plant Ui is decomposed into the sum of three control terms.

A first term is the parallel anticipation flow rate $QAP_i$, which gathers the sum of the natural inflow rates measured upstream of reach i and in the same. Therefore, it is the sum of the inflow rate Qe from upstream of the series of plants, that is the flow rate arriving at the first reach 1, to which the flow rates $Qa_t$ of the possible tributaries of each reach i are added. Thus:

$$QAP_i = Qe + \sum_{k=1}^{i} Qa_k$$

The second term, noted $QCH_i$, is a level regulation flow rate of the reach i. Traditionally, the equivalent level $zeq_i$ of reach i is controlled by plant Ui only by means of the level regulation, of the proportional-integral (PI) corrector type controlling the level of reach i to a level setpoint $Zc_i$, which depends in particular on the hydraulic requirements of reach i. The equivalent level $zeq_i$ corresponds to the weighting of several levels along reach i and is representative of the water volume in reach i.

A third term is usually a series anticipation flow rate $QAS_i$ relating to the level regulation of the reaches, taking into account the difference between the setpoint $Qcu_{i-1}$ and the parallel anticipation flow rate $QAP_{i-1}$ of the plant Ui–1 upstream of said plant Ui:

$$QAS_i = QCu_{i-1} - QAP_{i-1}$$

It is to be noted that generally the first upstream plant $U_1$ does not have a series anticipation available, $QAS_1=0$. It can be further shown that the series anticipation flow rate $QAS_i$ corresponds to the sum of the level regulation flow rate QCH of all the reaches upstream of said plant $U_i$, if no saturation or ramp limitation on the flow rates is activated, such that the series anticipation flow rates $QAS_i$ for a plant $U_i$ can also be written for $i \geq 2$ as:

$$QAS_i = \sum_{k=1}^{i} QCH_k$$

with $QAS_1=0$.
Thus, there is $$QCu_i = QAP_i + QCH_i + QAS_i$$

Insofar as these flow rate control terms aim at maintaining the level constant in the reaches outside a power regulation and outside a demodulation, they can be gathered as run-of-the-river flow rate setpoint $QF_i$:

$$QCu_i = QF_i = QAP_i + QCH_i + QAS_i$$

This driving system generally allows the levels of the reaches i to be regulated by modifying the turbined water flow rates by the hydroelectric plants $U_i$, so as to ensure hydraulic safety in any situation. Hydraulic safety relates in particular to the fulfillment of level requirements in the reaches. These level requirements are tidal range requirements: minimum and maximum levels permitted for each reach in order to allow navigation and ensure safety of goods and people. Tidal range is by definition low for run-of-the-river plants and is often null for the most upstream plant. The exploitation of series run-of-the-river plants is all the more difficult that the tidal ranges permitted are low. Further, other hydraulic requirements make this driving difficult. Thus, the inflow rate Qe is uncontrolled, and can strongly vary, resulting for example from the turbining of an upstream electrical producer, and/or upstream catchment area supplies (rain, snow melting . . . ).

It is also imposed to release, at the output of the series of plants, the inflow rate Qe, possibly added with the flow rates $Qa_i$ of the tributaries of the reaches. It is called demodulation. The outflow rate turbined by the last plant is thus required to be "demodulated". The conventional demodulation consists in releasing at the end of the chain the sum of the natural inflow rates measured upstream in order to cancel all the disturbances generated by the operation of the hydroelectric plants of the queue. These are however measured flow rates, that is marred by measurement errors; yet, the level regulations equipping the plants eliminate these measurement errors by turbining the real inflow rate.

The demodulation criterion to be fulfilled on the last hydroelectric plant n is thus $$Qt_n = QAP_n + \mu = Qe + \sum_{k=1}^{n} Qa_k + \mu$$

where $Qt_n$ designates the flow rate turbined by plant n and $\mu$ is a permissible tolerance, in the order 2% with respect to the inflow rate in the queue Qe. It is to be noted that this demodulation criterion is a strong requirement difficult to reconcile for common controls in other fields, and which thus prevents them from being used to control a plurality of hydroelectric plants arranged run of the river.

Within the scope of this driving, from the forecast the day before for the inflow rate Qe averaged over 24 hours, a production program is set by the producer optimiser. In theory, with this flow rate driving mode, the inflow rates in the queue are integrally released downstream, the water levels in the reaches are maintained at a constant height.

The goal of the operator of the series of plants is to fulfil as long as possible the power production program demanded by the optimiser while fulfilling the exploitation hydraulic (flow rate and level) requirements. The random character of the inflow rate Qe which can abruptly vary following a load variation of the upstream plant however makes this power generation program follow-up difficult.

However, if operating requirements (typically an inflow rate which substantially differs from that which has been used by the hydraulic producer to design the power setpoint) cause a risk of non-fulfillment of the hydraulic requirements (typically a drift in the reach levels), the operators naturally modify the power setpoint by "restating" the value to the grid manager. But, this "restatement" generates significant financial penalties attributed to the producer. It is thus desirable to minimise the number of daily restatements.

Thus, conventional systems for driving plants in flow rate has several drawbacks:
 the daily production program is only fulfilled with some tolerance and under several produced power prediction restatements,
 providing the frequency-power secondary regulation with the required dynamic performance is not possible,
 the demodulation at the level of the turbined flow rate on the last plant is only ensured with manual corrections in the plant flow rate setpoint $QCu_n$.

Further, no power regulation loop exists to hold the overall power of the series of plants. It means that in case of unpredicted disturbance in the inflow rates of the reaches I, a deviation is observed in the electric power made relative to the electric power programmed for the series of hydroelectric plants.

SUMMARY OF THE INVENTION

The object of the invention is to overcome at least one of these drawbacks, preferentially all of them, and in particular to enable the reach level and flow rate hydraulic requirements to be fulfilled, while fulfilling at best the electric production setpoints.

To that end, it is provided a system for driving a turbined water flow rate of a plurality of hydroelectric plants arranged in series along a watercourse with an open channel flow, defining upstream of each of them a plurality of respective reaches subjected to hydraulic flow rate and level requirements, said plurality of hydroelectric plants comprising at least three hydroelectric plants, wherein the turbined water flow rate for each of said plants is controlled by means of a flow rate setpoint on said plant determined from a run-of-the-river flow rate setpoint taking into account a level regulation of the reaches and the inflow rates in said reaches wherein the system comprises a regulation of an overall power output setpoint for said plurality of hydroelectric plants by means of a regulation flow rate setpoint taken into account by the flow rate setpoint of each of said plants and in that said regulation flow rate setpoint determined by said regulation is weighted for each of said plants by means of weighting coefficients as a function of the respective flow rate and level hydraulic requirements of the reaches defined upstream of said plants in order to meet said flow rate and level hydraulic requirements.

The invention is advantageously completed by the following characteristics, taken alone or according to any of their technically possible combinations:
- the overall power output setpoint corresponds to the sum of a power setpoint of a power program and a balancing power for the power grid to which the plurality of plants is connected;
- the regulation of the overall power produced by the plurality of hydroelectric plants to meet an overall power output setpoint controls an overall effective power setpoint corresponding to the sum of the effective power setpoints of each plant, the effective power setpoints of each plant being determined by means of the flow rate setpoint of each of said plants;
- the weighting coefficients are dynamic and vary over time;
- the sum of the weighting coefficients applied to the power regulation flow rate setpoint of the plants except for the last plant is equal to the number n of the plants:

$$\sum_{i=1}^{n-1} \alpha_i = n$$

- each of the weighting coefficients $\alpha_i$ is determined by minimising a criterion corresponding to an equation involving the weighting coefficient $\alpha_i$ to be determined and the weighting coefficient $\alpha_{i-1}$ applied to the immediately upstream plant, the weighting coefficient $\alpha_1$ of the first plant upstream of the queue being fixed;
- the weighting coefficients $\alpha_i$ are determined by taking into account a level deviation between a nominal level setpoint of the reach i and a prediction of the level of said reach i at an optimisation horizon;
- taking into account the level deviation takes into account the weighting coefficient $\alpha_i$ associated with a plant and the weighting $\alpha_{i-1}$ associated with the plant immediately upstream of said plant in a linear relationship corresponding to said level deviation;
- the weighting coefficients $\alpha_i$ are constant over time;
- for the m most upstream plants of the queue, with m≥1, the weighting coefficient $\alpha_i$ of a plant is higher than a weighting coefficient $\alpha_{i-1}$ of the plant immediately upstream of said plant:

$$\alpha_{i-1} < \alpha_i,$$

and for the n-r most downstream plants of the queue, with r≥1 and n the number of plants, the weighting coefficient $\alpha_i$ of a plant is lower than the weighting coefficient $\alpha_i$ of the plant immediately upstream of said plant:

$$\alpha_{i-1} > \alpha_i$$

- determining a coefficient $\alpha_i$ takes into account for the m most upstream plants of the queue with m≥1 (respectively for the n-r most downstream plants of the queue with r≥1 and n the number of plants), a ratio of a permitted volume variation for the reach i and a permitted volume variation for the first upstream reach (respectively for the last downstream reach);
- for the m most upstream plants of the queue, with m≥1 (respectively for the n-r most downstream plants of the queue, with r≥1 and n the number of plants), the weighting coefficient $\alpha_i$ of a plant is determined as a function of the weighting coefficient $\alpha_{i-1}$ of the plant immediately upstream of said plant and the ratio of a permitted volume variation for the reach i to a permitted volume variation for the first upstream reach (respectively for the last downstream reach), said ratio being weighted by the weighting coefficient associated with the first upstream reach (respectively by the weighting coefficient associated with the next-to-last downstream reach), whereas for the n-r-m plants between said most upstream plants of the queue and said n-r most downstream plants of the queue, the weighting coefficient corresponds to a same maximum value.

The invention also relates to a plurality of hydroelectric plants arranged in series along a watercourse with an open channel flow, defining upstream of each of them a plurality of respective reaches, said plurality of hydroelectric plants comprising at least three hydroelectric plants, and comprising a system for driving a turbined water flow rate according to the invention.

PRESENTATION OF THE FIGURES

Figure 3:
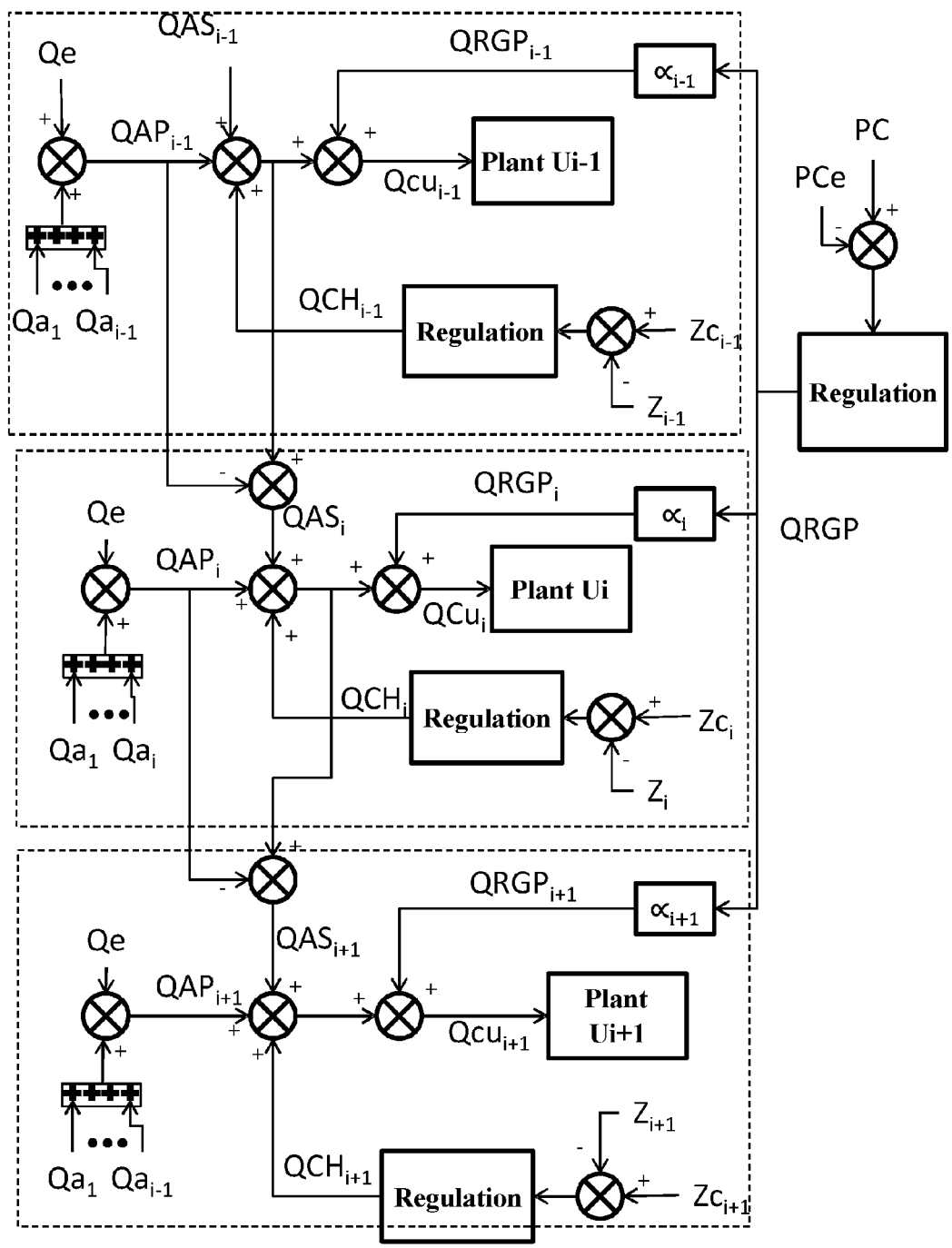

Further characteristics, purposes and advantages of the invention will become clearer from the description that follows, which is purely illustrative and non limiting, and which should be read with regard to the appended drawings in which:

FIG. 1, already commented, is a scheme illustrating the arrangement of a plurality of hydroelectric plants arranged in series along a watercourse defining upstream of them a plurality of respective reaches;

FIG. 2, already commented, is a scheme illustrating a driving system of the state of the art for a plurality of hydroelectric plants arranged in series along a watercourse according to the state of the art;

FIG. 3 is a scheme illustrating a system for driving a plurality of hydroelectric plants arranged in series along a watercourse according to possible embodiments of the invention.

DETAILED DESCRIPTION

The first aspect of the invention is concerned with a system for driving a turbined water flow rate of a plurality of hydroelectric plants arranged in series along a watercourse with an open channel flow, defining upstream of each of them a plurality of respective reaches. These are hydroelectric plants arranged run-of-the-river, along a river or a tributary, in a configuration referred to as an open channel flow by opposition to penstock, the water circulation of which is not with an open channel.

FIG. 1 illustrates a possible configuration of hydroelectric plants in which the invention can be implemented. Driving is implemented for at least three of said reaches, preferentially for each of said reaches i. As previously, the description will be made in an illustrating and a non-limiting way in particular with regard to this configuration, by repeating the notation set out above. The invention relates on the other hand also to a plurality of hydroelectric plants arranged in series along a watercourse with an open channel flow, defining upstream of each of them a plurality of respective reaches 1, 2, 3, 4, said plurality of hydroelectric plants comprising at least three hydroelectric plants, and comprising a turbined water flow rate management system according to the invention.

FIG. 3 schematically illustrates a system for driving hydroelectric plants in series run-of-the-river according to a possible embodiment. The invention is typically implemented in the case of an existing driving system for hydroelectric plants in series run-of-the-river as set forth in FIG. 2 detailed above. The common elements will therefore not be all necessarily detailed again.

As previously, the turbined water flow rate for each of said plants is controlled by means of a flow rate setpoint $QCU_i$ for said plant, determined from a run-of-the-river flow rate setpoint $QF_i$ taking into account a regulation of the level QCHi of the reaches and the inflow rates in said reaches, that is the inflow rate Qe and the sum of the flow rates of the supplies $Qa_i$ of the upstream reaches.

The system comprises a regulation of the electrical power for said plurality of hydroelectric plants to comply with an overall power output setpoint Pc by means of a power regulation flow rate setpoint QRGP taken into account by the flow rate setpoint $QCu_i$ for each of said plants.

The overall power output setpoint Pc can correspond to the sum of a power setpoint of a power program Pc0 and a balancing power, varying at each instant, of the power grid to which the plurality of plants is connected, in particular in the case where the electric power capability of the plurality of plants is sufficiently significant. Therefore, the aim is to provide services to the power grid by adjusting its production to the variations of remote control level N and to the variations in frequency so as to meet at any instant and automatically the production-consumption balance. For the plurality of plants, this service consists in producing—in addition to the power program setpoint Pc0—powers corresponding to what is commonly called the primary regulation and the secondary regulation while meeting the dynamic criteria defined by the power grid manager. Besides the power program setpoint Pc0, the overall power output setpoint Pc can also comprise a possible secondary regulation, whereas the primary regulation is managed by means of a local regulation peculiar to each production group equipping the plant Ui.

The primary regulation aims at reaching the production-consumption balance via controlling to the electrical frequency of the power grid. It is thus proportional to the frequency difference Δf between the electrical frequency on the grid and a fixed frequency.

The purpose of the secondary regulation is double: resorbing the residual frequency deviation induced by the primary regulation and correcting budget deviations of the regulation zones. For this reason, this regulation is implemented at the overall level of each zone by resorting to a secondary regulating power available from the production groups taking part in the regulation. Thus, Pr is the electric power corresponding to the participation stated by the operator of the queue of plants to this secondary regulation. A remote control signal N between −1 and 1 is applied to this power Pr by the power grid manager for balancing supply and demand within the power grid it takes in charge. Thus, the overall power output setpoint Pc can be written as:

$$Pc = Pc0 + N \cdot Pr$$

The overall power regulation by the plurality of hydroelectric plants to meet the overall power output setpoint Pc controls an effective overall power setpoint Pce corresponding to the sum of the effective power setpoints of each plant Pcei, the effective power setpoints of each plant being determined by means of the flow rate setpoint $QC_{ui}$ of each of said plants. More precisely, the overall effective power setpoint Pce is subtracted from the overall power setpoint Pc before regulation.

Indeed, a turbined water flow rate by a plant is controlled by means of a flow rate setpoint $QC_{ui}$, which is converted into an effective power setpoint $Pce_i$ for effectively controlling the production groups of the plant. Yet, this conversion involves flow rate/power charts, which are necessarily marred by errors. This closed loop of the overall power regulation enables errors introduced by the charts to be rejected.

The difference between the overall power setpoint Pc and the effective overall power setpoint Pce passes through a power regulation corrector which determines, from this difference, an overall power regulation flow rate setpoint QRGP which is taken into account by the flow rate setpoint $QCu_i$ of the plants. The power regulation corrector is for example a proportional-integral corrector. The sampling time is for example in the order of 5 seconds.

The overall regulation flow rate setpoint QRGP determined by the power regulation corrector is weighted for each plant by means of weighting coefficients $\alpha_i$ peculiar to each of said plants and as a function of the respective hydraulic characteristics of the reaches defined by said plants, to give a regulation flow rate setpoint $QRGP_i$ peculiar to each plant Ui:

$$QRGP_i = \alpha_i \times QRGP$$

The weighting coefficients $\alpha_i$ assume at least two different values, preferably at least three different values. They can be dynamic, that is variable over time or otherwise be static, that is constant.

This regulation flow rate setpoint $QRGP_i$ is used with other flow rate setpoints to give a plant flow rate setpoint Qcui for the plant Ui. In addition to the regulation flow rate setpoint $QRGP_i$, the plant flow rate setpoint $QC_{ui}$ typically takes into account the parallel anticipation flow rate QAPi, the series anticipation flow rate QASi and the level regulation flow rate QCHi. Thus, there can be $$QCu_i = QAP_i + QCH_i + QAS_i + QRGP_i$$

A demodulation flow rate QDDi can be added thereto aiming at meeting the demodulation criterion according to which the flow rate turbined by the last plant Un has to correspond to the flow rate Qe completed by the possible tributaries $Qa_i$ of the reaches i:

$$Qt_n = QAP_n + \mu = Qe + \sum_{k=1}^{n} Qa_i + \mu$$

where μ designates a permissible tolerance, in the order of 2% relative to the inflow rate in the queue Qe. The demodulation function is made by resorting to a downstream-queue flow rate regulation between the parallel anticipation flow rate $QAP_n$ to be followed by the last plant Un and the turbined flow rate Qtn to control of said last plant Un. The demodulation flow rate term QDD calculated is added to the flow rate setpoints of the last plant Un, or even the last plants Un to Un-k. This parallel action amounts to transferring the downstream demodulation requirement to upstream and to using the intermediate reaches to absorb the demodulation requirement.

Several methods can be used to define the weighting coefficients $\alpha_i$, including two methods that are set forth hereinafter. The first one involves dynamic weighting coefficients $\alpha_i$, whereas the other one involves constant weighting coefficients $\alpha_i$.

Dynamic Weighting Coefficients $\alpha_i$

In this method, an optimisation module has the object to distribute the queue power to be produced on each of the plants by calculating the coefficients $\alpha_i$ while meeting the hydraulic requirements, essentially the level and flow rate requirements.

The essential level requirement relates to meeting the permitted tidal ranges Mi, that is the difference between the maximum permitted level in the reach I and the level setpoint $Zc0_i$, on the equivalent levels $zeq_i$ of the reaches. The fixed level setpoint $Zc0_i$ is a constant level setpoint of the reach i, corresponding to a water level imposed for the reach i, on a long period of time, generally several years. Bounded variations, the permitted tidal ranges, are thus possible, but the fixed level setpoint $Zc0_i$ makes up an overall target level for reach i. The optimisation module has however the purpose to exploit at best the available tidal ranges to maximise the frequency-power secondary reserve capacity Pr applied to the queue of plants Ui and to minimise the number of possible restatements. The requirement on the flow rates essentially consists of meeting the downstream demodulation of the queue.

Each of the weighting coefficients $\alpha_i$ is determined by minimising a criterion corresponding to an equation involving the weighting coefficient $\alpha_i$ to be determined and the weighting coefficient $\alpha_{i-1}$ applied to the immediately upstream plant, the weighting coefficient $\alpha_1$ of the first-upstream plant U1 of the queue being fixed, and in particular being possibly zero in the case where no tidal range is permitted in reach 1.

Criterion to be Minimised

The optimisation is made according to a prediction horizon $T_{opt}$ typically between 3 minutes and 1 hour, and preferably between 15 minutes and 30 minutes. The criterion to be minimised at each calculation step, typically every five minutes, is the following one:

$$J = \sum_{i=1}^{n} \lambda_{Zi}^2 \cdot \varepsilon_i^2 + \sigma_D \cdot \beta^2 + \sigma_{RR} \cdot \sum_{i=1}^{n-1} (\alpha_i - \alpha_{i\_init})^2$$

(in the following, there is 1≤i≤n unless otherwise specified).

On the other hand, if $Mmax_i$ and $Mmin_i$ have to appear to take the reference levels $Href_i$, reference measurement of the level in reach i generally measured downstream of reach i into account, the requirements to be met are the following ones:

$$-\varepsilon_i + \frac{Mmax_i - Mmin_i}{2} - \frac{M_i}{2} \leq$$
$$A_i + \alpha_i \cdot B_i + \alpha_{i-1} \cdot C_i \leq \frac{Mmax_i - Mmin_i}{2} + \frac{M_i}{2} + \varepsilon_i$$

where $A_i + \alpha_i \cdot B_i + \alpha_{i-1} \cdot C_i = zc0_i - z\overset{'}{e}q_i(t_0 + T_{opt})$, which corresponds to the water level deviation in reach i;

$-\beta-\mu \leq Q_{Demodulation} + Q \leq +\mu + \beta$ où $Q_{Ddemodulation} + Q = [QCu_n(t_0+T_{opt}) - QAP_n(t_0+T_{opt})]$, $$\sum_{i=1}^{n-1} \alpha_i = n,$$

$\alpha_1 = 0$, a bounding of the weighting coefficients $\alpha_i$ $\alpha_{min} \leq \alpha_i \leq \alpha_{max}$ and a bounding of the variation in the weighting coefficients $\alpha_i$ between each time step $|\Delta\alpha_i| \leq \Delta\alpha_{max}$ for 1≤i≤n-1, $-300 \leq Q_{Ddemodulation} \leq +300$, with:

the convention $\alpha_n \cdot QRGP = Q_{Demodulation} = QRGP_n$ the convention $\alpha_0 = 0$, representing the absence of power regulation on the plants external to the queue being driven;

$Mmin_i = M_i + Href_i - zeq_i$;

$Mmax_i = 2 \cdot M_i - Mmin_i$;

μ tolerance on the demodulation quality;

$\sigma_D$, constant priority factor (set to prioritise demodulation);

$\sigma_{RR}$, constant return spring coefficient (a priori low not to compete with $J_1$ and/or $J_2$ when β and/or $\varepsilon_i$ are non zero);

$\lambda_{Zi}$, $A_i$, $B_i$, $C_i$ and Q are real numbers updated at each optimisation step;

$\alpha_{i\_init}$ corresponds to a known initial value of $\alpha_i$.

On the other hand, in order that the overall regulation flow rate setpoint QRGP is wholly reflected on the queue by means of the regulation flow rate setpoints $QRGP_i$, the sum of the weighting coefficients applied to the power regulation flow rate setpoint of the plants except for the last plant (the coefficient of which is dictated by demodulation) is equal to the number n of the plants:

$$\sum_{i=1}^{n-1} \alpha_i = n$$

Initial Values of the Weighting Coefficients $\alpha_i$

The initial values of the weighting coefficients $\alpha_i$ are determined beforehand and correspond to the set of coefficients provided to the optimisation module when initialised, or when re-initialised. It is reminded however that the first, fixed, coefficient $\alpha_1$, is preferably chosen zero and that the last coefficient $\alpha_n$ depends on the demodulation. The other initial weighting coefficients $\alpha_i$ can be determined in different ways.

One of them consists in determining the initial set from the hydropeaking overflow rates $\Delta QCM_i$ for each of the reaches i, that is the variations in the turbined flow rates due to the adaptation of electrical production to fluctuations in electricity demand. More precisely, they can be determined as a function of the proportion of the hydropeaking overflow rates $\Delta QCM_i$ that the plant Ui represents. For example, there can be thereby:

$$\alpha_{i\,init} = n \cdot \frac{\Delta QCM_i}{\sum_{i=1}^{n} \Delta QCM_i}$$

This determination allows a continuity relative to the existing configurations by virtue of the hydropeaking overflow rates $\Delta QCM_i$ taken into account. With this first method, an example of coefficient obtained for a queue of ten plants is the following set:

[0; 0.3710; 0.8207; 1.1804; 1.4727; 1.6863; 1.6863; 1.6863; 1.0961; 0].

Another method consists in deducing the initial weighting coefficients $\alpha_i$ from a static optimisation aiming at minimising the criterion $$\max_i \left(\frac{\alpha_{i-1} - \alpha_i}{S_i}\right)^2$$

With this second method, an example of coefficient obtained for a queue of ten plants is the following set:

[0; 0.2941; 0.6143; 0.9022; 1.1664; 1.7047; 2.2928; 2.0237; 1.0019; 0].

Expression of $[zc0_i - zeq_i(t_0 + T_{opt})]$

The weighting coefficients $\alpha_i$ are thus determined by taking into account a level deviation between a fixed nominal setpoint with the level $zc0_i$ of reach i and a prediction of the equivalent level $zeq_i$ of said reach i at an optimisation horizon $T_{opt}$:

$$[zc0_i - zeq_i(t_0 + T_{opt})].$$

By noting $t_0$ the present instant, for a considered reach i, the predicted weighted equivalent level $zeq_i(t_0 + T_{opt})$ is calculated from the flow rate setpoint $QCu_i$ of plant Ui and the flow rate setpoint $QCu_{i-1}$ of plant Ui-1 upstream of plant Ui:

$$zeq_i(t_0 + T_{opt}) = zeq_i(t_0) + \int_{t_0}^{t_0+T_{opt}} \frac{QCu_{i-1}(t) - QCu_i(t)}{S_i} dt$$

with $S_i$ the apparent area of reach i, that is the free area of reach i, considered as constant. It is to be noted that it is an approximation since the variation in the water level in reach i is considered in the present instant to and the optimisation horizon $T_{opt}$. But since the estimation of the variation in the equivalent level $\Delta zeq_i * S_i$ is a very good image of a volume variation in reach i, this approach is quite valid.

The trajectories of the flow rate setpoints $QCu_i$ of each plant i are estimated in the future from $t_0$ to $t_0 + T_{opt}$ with $T_{opt} = 5$ minutes:

$$QCu_i(t) = QAP_i(t) + QAS_i(t) + QCH_i(t) + QRGP_i(t)$$

$$QCu_{i-1}(t) = QAP_{i-1}(t) + QAS_{i-1}(t) + QCH_{i-1}(t) + QRGP_{i-1}(t)$$

If the reasoning is made on a time basis in the interval $[t_0; t_0 + T_{opt}]$:

the parallel anticipation flow rate $QAP_i(t)$ is considered as constant in a first approach (it is also possible to estimate a variable parallel anticipation flow rate $QAP_i(t)$ by considering a simple linear interpolation);

the level regulation flow rate $QCH_i(t)$ is considered as constant in a first approach. This approximation is relatively good when $|zc0_i - zeq_i| < M_i$, that is most of the time. Indeed, in this case, the level regulation of reach i works very little because the weighted level is accompanied by the setpoint, and $QCH_i(t)$ therefore evolves very little on the interval taken into account, in the order of five minutes;

the series anticipation flow rate $QAS_i(t)$ is considered as a constant in a first approach because it is $$\sum_{k=1}^{i-1} QCH_k(t)$$

As regards taking the power regulation into account, there is as a power regulation flow rate $QRGP_i$:

$$QRGP_i(t) = \alpha_i \cdot TI_{RGP}(t_0) + \alpha_i \cdot K_{I\,RGP} \int_{t_0}^{t_0+t}(Pc0(u) + N(u) \cdot Pr - Pce(u)) \cdot du + \alpha_i \cdot K_{P\,RGP} \cdot (Pc0(t) + N(t) \cdot Pr - Pce(t))$$

with $TI_{RGP}(t_0)$ an integral term of the power regulation at the instant $t_0$, and $K_{I\,RGP}$ and $K_{P\,RGP}$ gains of the power regulation corrector. The term $Pc0(t) + N(t) \cdot Pr - Pce(t)$ can be considered the following way:

$Pc0(t) + N(t) \cdot Pr$ constant in a first approach between to and $t_0 + T_{opt}$. However, a prediction of the inflow rate $Q_e$ enables $Pc0(t)$ to be estimated on the interval considered. It is also possible to contemplate to apply statistical methods to estimate $N(t)$ in the interval $[t_0; t_0 + T_{opt}]$;

$Pce(t)$ is considered as converging to $Pc0(t) + N(t) \cdot Pr$ as a ramp of 5 MW/min.

Then, the same reason is applied to $QAP_{i-1}(t)$, $QAS_{i-1}(t)$, $QCH_{i-1}(t)$ and $QRGP_{i-1}(t)$. Finally, it is thus obtained that $$[zc0_i - zeq_i(t_0 + T_{opt})] = [A_i + \alpha_i \cdot B_i + \alpha_{i-1} \cdot C_i].$$

Thus, taking the level deviation into account takes the weighting coefficient $\alpha_i$ associated with plant $U_i$ and the weighting $\alpha_{i-1}$ associated with plant $U_{i-1}$ immediately upstream of said plant $U_i$ into account in a linear relationship corresponding to said level deviation $[zc0_i - zeq_i(t_0 + T_{opt})]$.

Expression of $[QCu_n(t_0 + T_{opt}) - QAP_n(t_0 + T_{opt})$

By making the same reasoning as above, $[QCu_n(t0 + Topt) - QAP_n(t0 + Topt)]$ is written as $Q_{Demodulation} + Q$ and corresponds to meeting the demodulation criterion at the prediction horizon.

Designing the Level Setpoint

The level setpoint $Zc_i$ applied to the level regulator of plant Ui is calculated so as to accompany the natural evolution of the weighted level $zeq_i$ in reach i and thus to minimise the action of the level regulation. For this, an additional term $\Delta Zci$ can be added to the level setpoint $Zc0i$ of the level regulation of plant Ui:

$$Zc_i = Zc0_i + \Delta Zc_i$$

with:

$$\Delta Zc_i = \frac{1}{S_i} \int (QRGP_{i-1} - QRGP_i) dt$$

However, the implementation of the determination of dynamic weighting coefficients can turn out to be complex, and thereby it can be preferable to use weighting coefficients $\alpha i$ which are constant over time, and which are however optimised in order to meet the same requirements.

Constant Weighting Coefficients $\alpha_i$

The aim is to calculate coefficients $\alpha_i$ which are constant and optimal in terms of the time of emptying and filling the reaches i (i=1, 2, . . . , n) by operating the queue according to the law of communicating vessels, that is by transferring the volume of water contained in the upstream reaches to the downstream reaches when the regulation flow rate setpoint QRGP is positive and vice-versa, by transferring the volume of water contained in the downstream reaches to the upstream reaches when the regulation flow rate setpoint QRGP is negative. Thus, in the queue, there can be distinguished:

emitting reaches: the upstream reaches operating in emptying/filling;

transmitting reaches: the intermediate reaches, playing a role either as direct transmission (without water storage) as long as the demodulation does not act on themselves, or as absorption when this acts on them;

receiver reaches: the downstream reaches operating in filling/emptying, that is conversely to the upstream reaches.

The evolution of the water volume $V_i$ in a reach i is governed by the equation:

$$\frac{d(V0_i + \Delta V_i)}{dt} = QF_{i-1} + u_{i-1} - (QF_i + u_i)$$

where the volume $V0_i$ corresponds to the static level $Zc0_i$ in reach i held by virtue of the run-of-the-river flow rates $QFj (j=i$ and $i-1)$ including during hydraulic disturbances, typically unforeseen supplies not measured in a reach. The control variables $u_j = QRGP_j + QDD_j$ enable the objectives and requirements of queue driving and demodulation to be met.

In the absence of demodulation, one can write:

$$\frac{d\Delta V_i}{dt} = (\alpha_{i-1} - \alpha_i) QRGP$$

with $\Delta V_i = S_i(Z_i - Zc0_i)$ and $S_i$ the area of reach i.

By considering the initial state $\Delta V_i(0)=0$ and the final state $\Delta V_i(T)$, there is:

$$\Delta V_i(T) = (\alpha_{i-1} - \alpha_i) \int_0^T QRGP \, dt$$

Thus, at the instant t=T, the ratio R of the volume variations between any two reaches with indices i and x can be written as:

$$R = \frac{\Delta V_i(T)}{\Delta V_x(T)} = \frac{\alpha_{i-1} - \alpha_i}{\alpha_{x-1} - \alpha_x}$$

By designating T the emptying (respectively filling) time of reach i for a modification of its half-band equivalent level $-Mvi$ (respectively Mvi) of permitted tidal range volume, there is $\Delta V_i(T) = \pm M_{vi}$.

The emitting reaches i are characterised by $\alpha_{i-1} < \alpha_i$ and the receiving reaches i are characterised by $\alpha_{i-1} > \alpha_i$. In other words, the emitting reaches are being emptied if the regulation flow rate setpoint QRGP is positive whereas the receiving reaches are being filled, whereas the emitting reaches are being filled if the regulation flow rate setpoint QRGP is negative whereas the receiving reaches are being emptied.

Thus, for the m most upstream plants of the queue associated with the emitting reaches, with $m \geq 1$, the weighting coefficient $\alpha_i$ of a plant $U_i$ is higher than the weighting coefficient $\alpha_{i-1}$ of the plant immediately upstream of said plant $U_i$:

$$\alpha_{i-1} < \alpha_i,$$

and for the n-r most downstream plants of the queue associated with the receiving reaches, with $r \geq 1$ and n the number of plants, the weighting coefficient $\alpha_i$ of a plant $U_i$ is lower than the weighting coefficient $\alpha_{i-1}$ of plant $U_{i-1}$ immediately upstream of said plant $U_i$:

$$\alpha_{i-1} > \alpha_i.$$

As regards the intermediate transmitting reaches, they are characterised by $\alpha_{i-1} = \alpha_i = \alpha_{max}$. The maximum value of the coefficients $\alpha_{max}$ is determined irrespective of the emptying time if the volume budget is perfectly met, and can be for example arbitrary set to 1 to control flow rate saturation of the hydroelectric plants $U_i$.

The aim of $\alpha_i$ calculation is to minimise the number of restatements, that is to minimise the times the power program setpoint Pc0 is modified. It amounts to minimising the volume variations or to maximising the emptying/filling time T.

To maximise the emptying/filling time T and ensure optimality of the coefficients $\alpha_i$:

the number of transmitting reaches is chosen so as to equilibrate the volume balance of the water transfer to the queue, that is such that the sum of the volumes corresponding to the permitted tidal ranges Mvi of the emitting reaches is as close as possible to that of the receiving reaches;

the emitting and receiving reaches are synchronous by simultaneous saturation which is ensured by $$\Delta V_i(T) = (\alpha_{i-1} - \alpha_i) \int_0^T QRGP \, dt$$

by setting: $R = Mv_i/Mv_x$ for the emitting reaches and $R = (-Mv_i)/(-Mv_x) = Mv_i/Mv_x$ for the receiving reaches.

By applying these two principles on a group of emitting or receiving reaches $(R = Mv_i/Mv_x)$, from $$R = \frac{\Delta V_i(T)}{\Delta V_x(T)} = \frac{\alpha_{i-1} - \alpha_i}{\alpha_{x-1} - \alpha_x}$$

one obtains $$\alpha_i = \alpha_{i-1} - \frac{Mv_i}{Mv_x}(\alpha_{x-1} - \alpha_x)$$

The determination of a coefficient $\alpha_i$ thus takes into account a ratio of a volume variation permitted for the reach to a volume variation permitted for a reach upstream of said reach. The boundary conditions are defined on the one hand by reach 1 which does not receive a power regulation flow rate setpoint QRGP upstream, that is $\alpha_0=0$ where $\alpha_0$ represents the absence of power regulation on the plants external to the driven queue, and by the last reach n which is subjected to the demodulation criterion, that is $\alpha_n=0$.

Consequently, $x=1$ is taken for the emitting reaches and $x=n$ is taken for the receiving reaches. The transmitting reaches are located between the indices m and r. Thus, for $i=1, 2, \ldots, n$: there is:

for the emitting reaches: $\alpha_i = \alpha_{i-1} + \alpha_i \cdot Mv_i/Mv_1$;

for the receiving reaches: $\alpha_i = \alpha_{i-1} - \alpha_{n-1} \cdot Mv_i/Mv_n$;

and for the transmitting reaches: $\alpha_i = \alpha_{i-1} = \alpha_{max}$.

Consequently, for the m most upstream plants of the queue, with $m \geq 1$ (respectively for the n-r most downstream plants of the queue, with $r \geq 1$ and n the number of plants), the weighting coefficient $\alpha_i$ of a plant $U_i$ is determined as a function of the weighting coefficient $\alpha_{i-1}$ of the plant $U_{i-1}$ immediately upstream of said plant $U_i$ and the ratio of a volume variation permitted for reach i to a volume variation permitted for the first upstream reach with index 1 (respectively for the last downstream reach with index n), said ratio being weighted by the weighting coefficient $\alpha_1$ associated with the first upstream reach 1 (respectively by the weighting coefficient $\alpha_{n-1}$ associated with the next-to-last downstream reach with index n-1), whereas for the plants n-r-m between said m most upstream plants of the queue and said n-r most downstream plants of the queue, the weighting coefficient corresponds to a same maximum value $\alpha_{max}$.

To determine $\alpha_1$ and $\alpha_{n-1}$, it is sufficient to use the recurrence of the equations below:

for the emitting reaches $$\alpha_i = \alpha_1 \left(1 + \frac{Mv_2}{Mv_1} + \frac{Mv_3}{Mv_1} + \ldots + \frac{Mv_i}{Mv_1}\right)$$

for the receiving reaches:

$$\alpha_{n-i} = \alpha_{n-1}\left(1 + \frac{Mv_{n-1}}{Mv_n} + \frac{Mv_{n-2}}{Mv_n} + \ldots + \frac{Mv_{n-i+1}}{Mv_n}\right)$$

for the transmitting reaches:

$\alpha_m = \alpha_r = \alpha_{max}$

Hence, by setting $i=m$ in the equation of the emitting reaches and $n-i=r$ in the equation of the receiving reaches, as a result:

$$\alpha_1 = \frac{\alpha_{max}}{1 + \sum_{k=3}^{m} Mv_k/Mv_2}$$

and $$\alpha_{n-1} = \frac{\alpha_{max}}{1 + \sum_{k=r+1}^{n-1} Mv_k/Mv_n}$$

are obtained.

This static optimisation of the weighting coefficients $\alpha_i$ has the advantage of offering control limiting variations in the turbined flow rate, and which:

limits level fluctuations in reaches thus avoiding a degradation in holding the levels ensured by level regulation, limits operations of actuators and valving thus reducing their mechanical fatigue.

Designing the Level Setpoint

The level setpoint $Zc_i$ applied to the level regulator of plant Ui is calculated so as to accompany the natural evolution of the weighted level $zeq_i$ in reach i and thus to minimise the action of the level regulation. For this, an additional term $\Delta Zc_i$ can be added to the level setpoint $Zc0_i$ of the level regulation of plant Ui:

$Zc_i = Zc0_i + \Delta Zc_i$

For the emitting reaches, the additional term is:

$$\Delta Zc_i = \frac{1}{S_i}\int (QRGP_{i-1} - QRGP_i)dt$$

with $S_i$ designating the area of the reach i.

For the transmitting reaches and the receiving reaches, the level setpoint deviation becomes:

$$\Delta Zc_i = \frac{1}{S_i}\int (QRGP_{i-1} + QDD_{i-1} - QRGP_i - QDD_i)dt$$

with $\Delta Zc_i$ is bounded between a minimum level and a permissible maximum level. It is to be noted that the demodulation flow rate setpoint $QDD_i$ corresponds, for the plants of the receiving reaches, to a same overall setpoint noted QDD whereas for the plants of the transmitting reaches, it is a local demodulation setpoint.

Demodulation

As explained above, demodulation consists in meeting the demodulation criterion on the last plant $$Qt_n = QAP_n + \mu = Qe + \sum_{k=1}^{n} Qa_k + \mu$$

where $\mu$ designates a permissible tolerance, in the order of 2% relative to the inflow rate in the queue Qe. The demodulation function is made by resorting to a queue downstream flow rate regulation between the parallel anticipation flow rate setpoint $QAP_n$ to be followed and the turbined flow rate Qtn to control. The demodulation flow rate term QDD calculated is added to the flow rate setpoints of all the power plants of receiving reaches. This parallel action amounts to transferring upstream the downstream demodulation requirement and to using transmitting reaches to absorb the demodulation requirement.

The overall demodulation flow rate term QDD is determined by a proportional-integral type regulation on the difference between the parallel anticipation flow rate $QAP_n$ and the flow rate $Qt_n$ turbined by the last plant Un.

To control evolution of the levels in transmitting reaches, a regulation of the central downstream level setpoint is implemented so as to re-centre the levels of the reaches. It calculates a local demodulation flow rate term QDDi which is added to the flow rates of the plants of the transmitting reaches. Thus, the local demodulation flow rate term QDDi of the plant of reach i is determined by a proportional-integral type regulation on the difference between the fixed level setpoint $Zc0_{i+1}$ of the plant of the downstream reach i+1 and the level setpoint $Zc_{i+1}$ applied to the level regulation of the plant of the downstream reach i+1.

The invention claimed is:

1. A system for driving a turbined water flow rate of a plurality of hydroelectric plants arranged in series along a watercourse with an open channel flow, defining upstream of each of the hydroelectric plants a plurality of respective reaches subjected to hydraulic flow rate and level requirements, said plurality of hydroelectric plants comprising at least three hydroelectric plants, wherein the turbined water flow rate for each of said plants is controlled by means of a flow rate setpoint on said plant determined from a run-of-the-river flow rate setpoint taking into account a level regulation of the reaches and the inflow rates in said reaches,
wherein the system comprises a regulation of an overall power output setpoint for said plurality of hydroelectric plants by means of a regulation flow rate setpoint taken into account by the flow rate setpoint of each of said plants and in that said regulation flow rate setpoint determined by said regulation is weighted for each of said plants by means of weighting coefficients as a function of the respective flow rate and level hydraulic requirements of the reaches defined upstream of said plants in order to meet said flow rate and level hydraulic requirements.

2. The system according to claim 1, wherein the overall power output setpoint corresponds to the sum of a power setpoint of a power program and a balancing power for the power grid to which the plurality of plants is connected.

3. The system according to claim 1, wherein the regulation of the overall power produced by the plurality of hydroelectric plants to meet an overall power output setpoint controls an overall effective power setpoint corresponding to the sum of the effective power setpoints of each plant, the effective power setpoints of each plant being determined by means of the flow rate setpoint of each of said plants.

4. The system according to claim 1, wherein the weighting coefficients $\alpha_i$ are dynamic and vary over time.

5. The system according to claim 4, wherein a sum of the weighting coefficients $\alpha_i$ applied to the power regulation flow rate setpoint of the plants except for the last plant is equal to the number n of the plants:

$$\sum_{i=1}^{n-1} \alpha_i = n.$$

6. The system according to claim 4, wherein each of the weighting coefficients $\alpha_i$ is determined by minimizing a criterion corresponding to an equation involving the weighting coefficient $\alpha_i$ to be determined and the weighting coefficient $\alpha_{i-1}$ applied to the immediately upstream plant, the weighting coefficient $\alpha_1$ of the first plant upstream of the queue being fixed.

7. The system according to claim 4, wherein the weighting coefficients $\alpha_i$ are determined by taking into account a level deviation between a nominal level setpoint of the reach i and a prediction of the level of said reach i at an optimisation horizon.

8. The system according to claim 7, wherein taking into account the level deviation takes into account the weighting coefficient $\alpha_i$ associated with a plant and the weighting $\alpha_{i-1}$ associated with the plant immediately upstream of said plant in a linear relationship corresponding to said level deviation.

9. The system according to claim 1, wherein the weighting coefficients $\alpha_i$ are constant over time.

10. The system according to claim 9, wherein for m most upstream plants of the queue, with m≥1, the weighting coefficient $\alpha_i$ of a plant is higher than a weighting coefficient $\alpha_{i-1}$ of the plant immediately upstream of said plant:

$$\alpha_{i-1} < \alpha_i,$$

and for n-r most downstream plants of the queue, with r≥1 and n the number of plants, the weighting coefficient $\alpha_i$ of a plant is lower than the weighting coefficient $\alpha_{i-1}$ of the plant immediately upstream of said plant:

$$\alpha_{i-1} > \alpha_i.$$

11. The system according to claim 9, wherein determining a coefficient $\alpha_i$ takes into account for m most upstream plants of the queue with m≥1 (respectively for n-r most downstream plants of the queue with r≥1 and n the number of plants), a ratio of a permitted volume variation for the reach i and a permitted volume variation for the first upstream reach (respectively for the last downstream reach).

12. The system according to claim 9, wherein for m most upstream plants of the queue, with m≥1 (respectively for n-r most downstream plants of the queue, with r≥1 and n the number of plants), the weighting coefficient $\alpha_i$ of a plant is determined as a function of the weighting coefficient $\alpha_{i-1}$ of the plant immediately upstream of said plant and the ratio of a permitted volume variation for the reach i to a permitted volume variation for the first upstream reach (respectively for the last downstream reach), said ratio being weighted by the weighting coefficient associated with the first upstream reach (respectively by the weighting coefficient associated with the next-to-last downstream reach),
whereas for the n-r-m plants between said most upstream plants of the queue and said n-r most downstream plants of the queue, the weighting coefficient corresponds to a same maximum value.

13. A plurality of hydroelectric plants arranged in series along a watercourse with an open channel flow, defining upstream of each of hydroelectric plants a plurality of respective reaches, said plurality of hydroelectric plants comprising at least three hydroelectric plants, and comprising a system for driving a turbined water flow rate according to claim 1, wherein the turbined water flow rate for each of said plants is controlled by means of a flow rate setpoint on said plant determined from a run-of-the-river flow rate setpoint taking into account a level regulation of the reaches and the inflow rates in said reaches,
wherein the system comprises a regulation of an overall power output setpoint for said plurality of hydroelectric plants by means of a regulation flow rate setpoint taken into account by the flow rate setpoint of each of said plants and in that said regulation flow rate setpoint determined by said regulation is weighted for each of said plants by means of weighting coefficients as a function of the respective flow rate and level hydraulic requirements of the reaches defined upstream of said plants in order to meet said flow rate and level hydraulic requirements.

* * * * *